United States Patent [19]

Galetto et al.

[11] Patent Number: 4,470,056

[45] Date of Patent: Sep. 4, 1984

[54] CONTROLLING A MULTI-WIRE PRINTHEAD

[75] Inventors: Louis V. Galetto, Charlotte, N.C.; James M. Rakes, Leander, Tex.

[73] Assignee: International Business Machines Corporation, Armonk, N.Y.

[21] Appl. No.: 335,481

[22] Filed: Dec. 29, 1981

[51] Int. Cl.³ ............................................. G01D 15/06
[52] U.S. Cl. .................................................... 346/154
[58] Field of Search .......... 346/76 PH, 154, 162–165; 307/270; 358/297, 300; 178/30; 369/47

[56] References Cited

U.S. PATENT DOCUMENTS

| | | | |
|---|---|---|---|
| 3,732,573 | 5/1973 | Merka et al. | 346/154 |
| 3,825,776 | 7/1974 | Jacquart | 307/270 |
| 3,846,801 | 11/1974 | DuMont et al. | 346/165 |
| 4,181,912 | 1/1980 | Satake | 346/154 |
| 4,183,032 | 1/1980 | Ohbori et al. | 346/154 X |
| 4,186,406 | 1/1980 | Bahr et al. | 346/163 |
| 4,262,294 | 4/1981 | Hara et al. | 346/154 |

FOREIGN PATENT DOCUMENTS 2648028  4/1978  Fed. Rep. of Germany .
1221622  2/1971  United Kingdom .

Primary Examiner—Thomas H. Tarcza
Attorney, Agent, or Firm—Andrea P. Bryant

[57] ABSTRACT

A current shunt multiplexed driver circuit in a high resolution multi-wire printhead is provided for use in an electroerosion printer. The circuit can reduce to the number of active devices required per print wire to two times the square root of the number of wires.

10 Claims, 4 Drawing Figures

CONTROLLING A MULTI-WIRE PRINTHEAD

DESCRIPTION

TECHNICAL FIELD

The present invention relates to improvement in a driver circuit for a multi-wire printhead for electroerosion printing.

Electroerosion printing is a high speed, low power consumption, low noise printing technology which requires special coded paper. The paper base is coated with ink, which is in turn covered with a 200–400 angstrom thick coating of aluminum. Passing current through a wire (which may be tungsten) in an electroerosion printhead creates heat at the wire-aluminum interface sufficient to melt and vaporize the aluminum thereby exposing the ink beneath the aluminum.

The melting and vaporizing of the aluminum produces a voltage discharge between the aluminum surface and tungsten wire. The entire process occurs in or about ten microseconds. The area of ink exposed by the removal of the aluminum is the dot or portion of the character or symbol to be formed. With proper contact pressure and energy input, dot configuration corresponds to the tungsten wire element cross-section.

In a page-width multi-wire printhead many hundred wires are provided in a one-dimensional array. Individual wires are energized to form portions of symbols to appear in a line across the entire page. The page is then advanced and the wires energized again to form the next row of dots in the row of symbols being produced.

BACKGROUND ART

U.S. Pat. No. 4,186,406 to Bahr et al. and commonly assigned relates to a multi-electro printhead for electroerosion printers. Apparatus and a method of providing a multiplex control for the plurality of electrodes is provided using a technique which allows the elimination of a number of control leads. A single line is commonly arranged to carry all energizing signals to all electrodes. The decoding means is provided to condition individual electrodes during energization. Circuit means is provided for energizing each pair of electrodes through a portion of the circuit common to both electrodes by rendering the individual electrodes responsive only to a particular polarity of electrical signal energization. This patent teaches a movable printhead controlled by a circuit which utilizes the concept of activating two adjacent electrodes via one common printhead line at different times wherein the activation pulse applied at different times is of opposite to polarities.

U.S. Pat. No. 3,846,801 to DuMont et al. relates to electrographic drawing apparatus comprising a multiplicity of writing electrodes in contact with electrosensitive paper. The signals are distributed to the respective electrodes by time division demultiplexers. Electrodes are preferably energized in a progressive sequence in which each is connected for energization after the preceding one in line.

U.S. Pat. No. 3,825,776 to Jacquart and commonly assigned teaches a switchable current generator for selectively establishing current loops for providing high stable null, and equal but opposite polarity currents dependent only on resistive means.

U.S. Pat. No. 3,732,573 to Merka et al. relates to an electrographic printer having a multiplex matrix driving circuit which reduces the number of switches needed to drive the stylic.

DISCLOSURE OF INVENTION

The present invention provides a technique for multiplexing drivers of a plurality of wires in a one-dimensional array for electroerosion printing which results in a significant reduction in component costs.

Conventional electronic multiplexing can be achieved if switching transistors have the ability to control the potential at both terminals of the device being energized. This constraint may not be met in the electroerosion printhead because the aluminum paper coating must be at substantially ground potential to minimize operator safety hazards. All of the advantages of multiplexing are achieved in the present invention by providing a current source from ground through the aluminum coating into the printhead wire and then into a large negative potential to form a dot. Dot formation is avoided by providing an alternate current source which bypasses the printhead wire.

Figure 1:
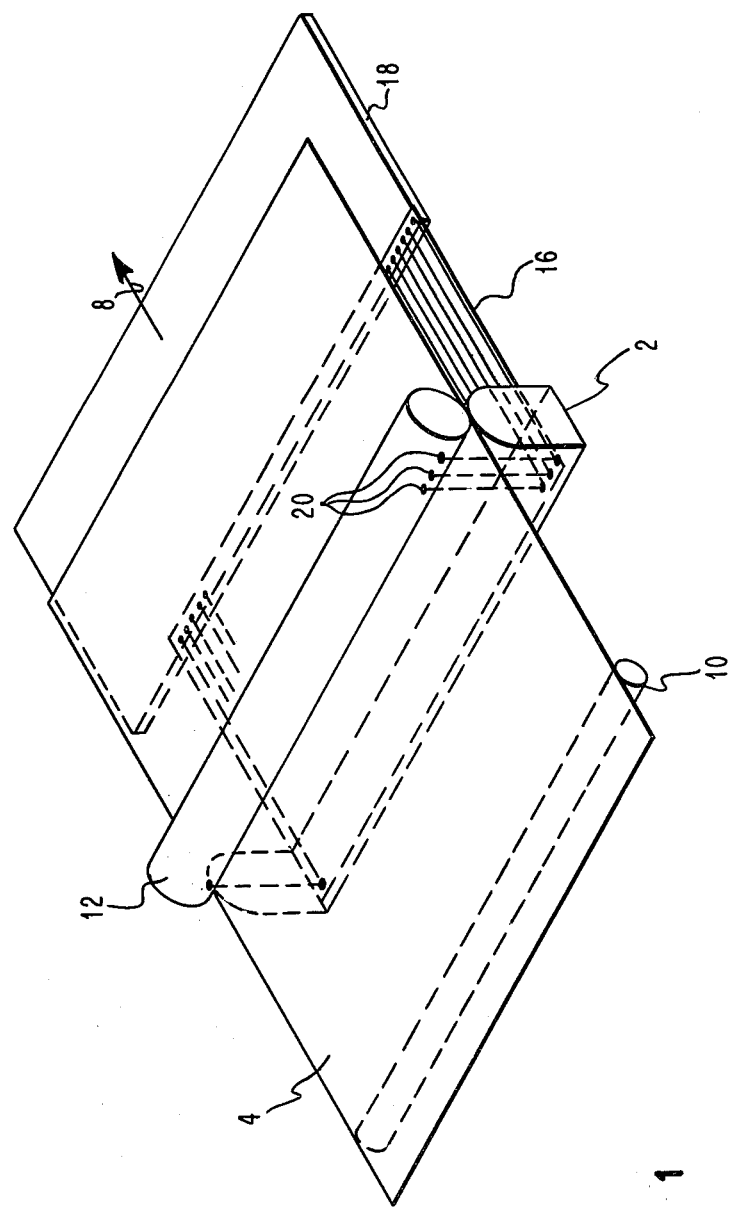
FIG. 1 is a schematic illustration of an electroerosion printer.

Refer now to FIG. 1 which schematically shows a printer in which the present invention may be embodied. Multi-wire printhead 2 is positioned so that its operating face is in contact with the aluminum coating on paper 4. In this illustration head 2 is stationary while paper moves across it in the direction of arrow 8. Grounding bar 10 provides a source potential from which to pull current thru the print wires into a large negative potential and minimizes operator safety hazards. Platen 12 is provided to maintain proper contact pressure between printhead 2 and aluminum paper 4. Flat cable 16 is provided to connect electronic controls 18 to the individual tungsten wires 20 of head 2.

Printhead 2 is provided with, for example, 800 individual wires which may be controlled in 40 groups of 20 each. The head 2 may be constructed of tungsten wire in accordance with commonly assigned copending application Ser. No. 213,516 to W. Goff et al. entitled "Multi-Wire Nonimpact Printhead and Method of Manufacture" now U.S. Pat. No. 4,397,085.

Only the operative elements of an electroerosion printer are shown schematically in FIG. 1. It is to be understood that such a basic printer or others designs may be used.

Figure 2:
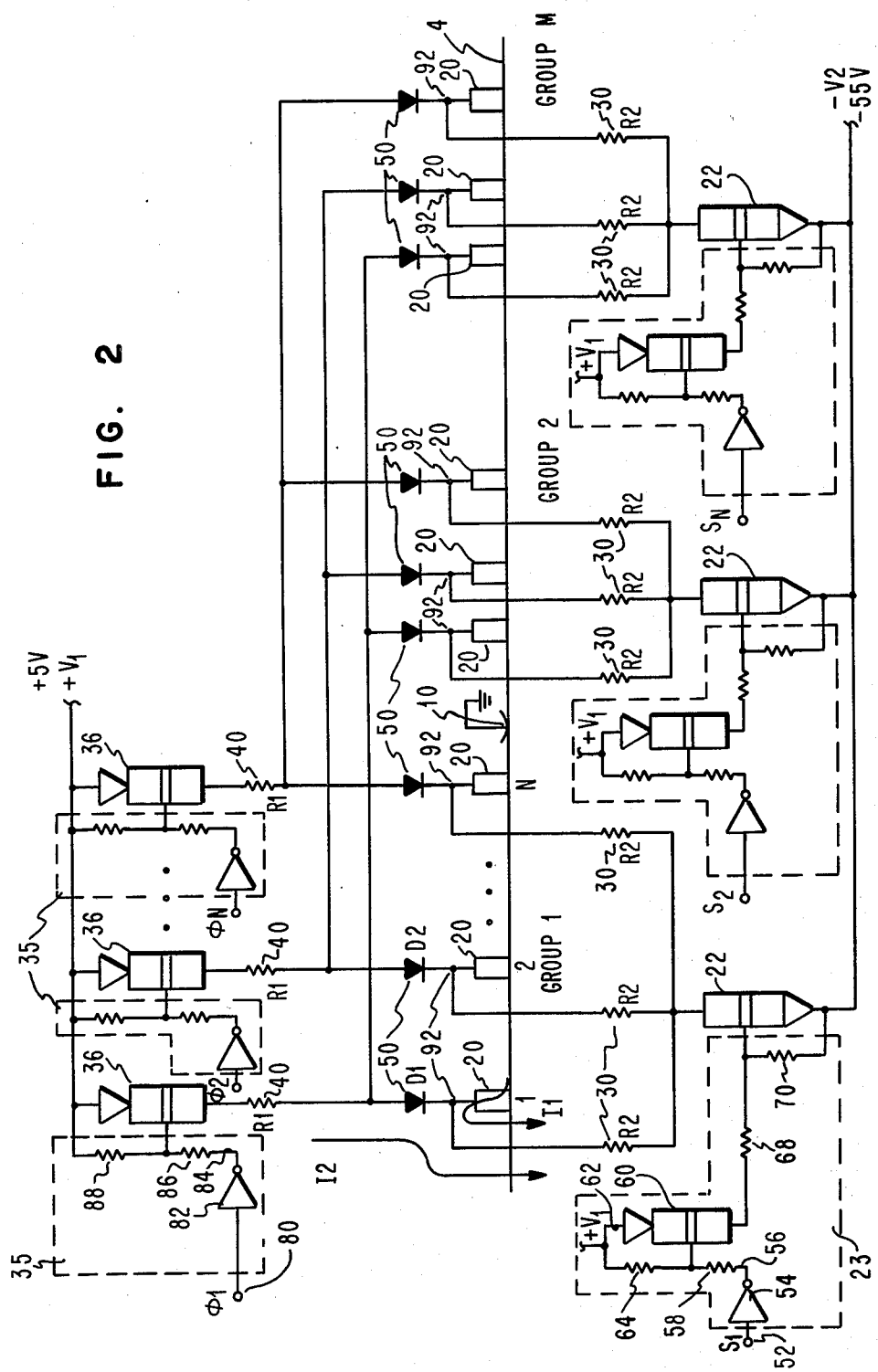
FIG. 2 represents the driver circuit for print head to a FIG. 1.

Refer now to FIG. 2 which represents the driver circuit of the present invention. FIG. 2 schematically shows the print wires making up the multi-wire head at the surface of aluminum coated paper 4. The print wires are for energization purposes grouped in M groups having N wires each. Each individual wire 20 is at ground potential where it contacts aluminum paper 4 as a result of grounding bar 10. A number M of NPN transistor switches 22, of which three are shown, are provided in a number to correspond with the number of groups into which the individual wires 20 are divided. Transistor switches 22 are each connected to a negative potential V2 of −55 volts. N print wires 20 are connected in parallel through equal resistors 30 to transistors 22.

N PNP selector transistors are provided and are connected through resistance 40 to the wire 20 in each group corresponding to that transistor. That is, the Nth print wire in each group M is connected and parallel to the Nth PNP transistor 36. The N PNP 36 switches are connected to a source of positive potential V1 which is 5 volts. Each print wire 20 is further provided with a diode 50 for isolating a particular wire from the similarly positioned print wire in other groups.

Each group selector transistor is activated by a level shift circuit. For purposes of clarity only the level shift circuit 23 associated with group selector transistor 22 will be described in detail. A selector signal S1 is applied to terminal 52 when it is desired to activate transistor 22 and selector group 1 print wires. Signal S1 is developed by a symbol generator or the like in a conventional manner. That signal is inverted in inverter 54. The inverted signal on line 56 which is connected to resistor 58 and is applied to transistor 60. A source of positive voltage of 5 volts is connected to line 62 which also includes resistor 64. The voltage from transistor 60 drops across resistor 68 and is applied to transistor 22 and branches over across resistor 70 and is applied as it travels to the negative potential V2 which is at negative 55 volts.

Similarly, each print wire with a group selector transistor 36 is provided with an activation circuit 35. Again, for simplicity, only one activation circuit 35 will be described. Each activation circuit 35 is energized by symbol generating means (not shown). A $\Phi_N$ signal is applied at terminal 80. The signal is inverted in inverter 82. The inverted signal on line 84 passes resistor 86 and is applied across resistor 88 thereby activating transistor 35 switch 36. Thus voltage V1 is dropped across resistor R1 generating a current to junction 92.

Dots are formed by creating a current source from ground through the aluminum coating on the paper into the print wire 20 and then sent into a large negative potential. In FIG. 2 this current is represented by the arrow $I_1$ and equals $-V2/R2$. Formation of a dot is prevented by providing an alternate current source represented by the arrow $I_2$ and equal to potential V1/R1 which bypasses the print wire 20 paper 4 junction and satisfies the requirements of the current source established by negative V2 and R2.

Figure 3:
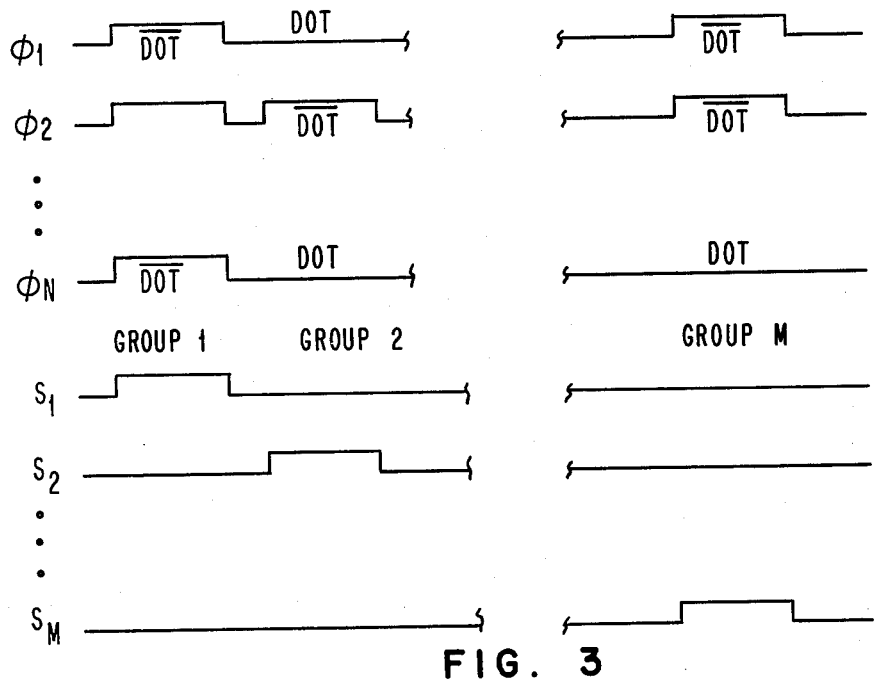
FIG. 3 is a timing diagram of the operation of the circuit of the present invention.

The operation of the driver circuit of the present invention may be more readily understood having reference to the timing diagram shown in FIG. 3. The logic signals shown in FIG. 3 represent the activation signals applied to the print wire within group transistors 22 and the signals applied to the group selector transistors 36 and graphically illustrate dot formation on an entire line. The $\Phi_1$, $\Phi_2$ and $\Phi_N$ lines represent the signals applied to the activation circuits 35 in FIG. 2. Thus, since the Groups 1-M represent a left to right progression across the print page when all of the print wire within group transistors 36 are on, no dots are formed. When the Group 2 selector transistor 36 has been activated, but the $\Phi_1$ and $\Phi_N$ print wire within group transistors 36 are down then a dot is formed by the first and Nth print wire within Group 2. When SM is activated, $\Phi_1$ and $\Phi_2$ are both up so no dots are formed, however, if $\Phi_M$ is down and the $S_N$ line is up, a dot is formed by the nth print wire in group M.

Figure 4:
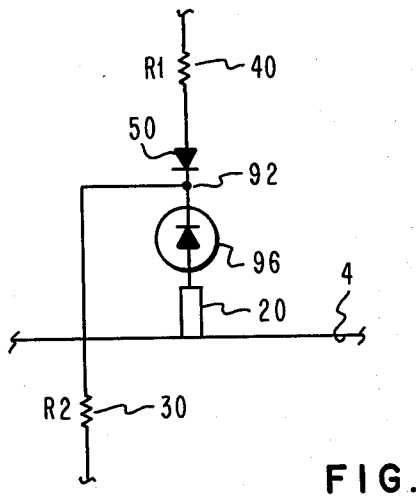
FIG. 4 illustrates a possible modification to the circuit of the present invention.

When a particular print wire is turned on to avoid forming a dot, the ratio of resistors R1 40 to R2 30 must be such that approximately zero potential is established at point 92 in the circuit for driving each individual print wire. That is, at the point where the current shunt line branches from the line which leads directly to each individual print wire 20. For an electrical pulse width of 10-15 microseconds duration, a magnitude of approximately plus or minus 20 volts must be present across the wire-paper contact to sustain vaporization of the aluminum coating on paper 4. Hence, if the potential at points 92 is kept below this threshold voltage no blocking diode (see FIG. 4) is needed between a point 92 and the print wire 20 (FIG. 2) to prevent undesired dot formation.

It is the elimination of this requirement, that is another diode for every print wire, which accounts for a portion of the significant cost savings in driving an electroerosion multi-wire printhead in accordance with the present invention. Only two components—isolating diode 50 and resistor R2 30 (FIG. 2) are required for each and every print wire 20. In high resolution multi-wire printheads with hundreds of print wires the saving is obvious. This current shunting technique as employed in the present invention can reduce the number of transistors required from the conventional one per print wire to 2 times the square root of the number of wires.

The circuit of FIG. 2 operates by firing or not firing N number of wires in a particular group M at any given time. The group is selected by turning on one of the transistor switches 22 by applying the activation signal $S_1$, $S_2$, or $S_n$. All of the print wire within group selector transistors 36, of which three are shown, are turned on when a group is selected unless a dot is to be printed. If dot formation is desired then that particular print wire within group selector transistor is turned off.

While the invention has been particularly shown and described with reference to a preferred embodiment, it will be understood by those skilled in the art that changes in form and detail may be made without departing from the spirit and scope of the invention.

We claim:

1. Circuit apparatus for selectively energizing individual wires in an electroerosion printhead for forming marks on grounded metal coated paper including a plurality of wires adjacent the metal coated paper and arranged in M groups having an equal number N wires comprising:

M selector transistors for selecting a group M of wires;

N transistor switches for selecting individual wires in a group M;

means for generating a first current from ground through the metal coated paper and each non-selected wire into a negative potential source to make a mark; and means for generating a second current from a positive potential source and bypassing the metal coated paper wire junction to avoid making a mark.

2. An improved method for controlling the firing of individual wires in a multi-wire print head to make marks on metal coated paper comprising the steps of:

generating a first current from ground through the metal coated paper, a wire and a source of negative potential to make a mark; and generating a second current bypassing the wire metal coated paper boundary from a source of positive potential into a source of negative potential to avoid making a mark.

3. The method of claim 2 comprising the additional steps of:
- arranging the print wires in M groups of N wires each, M×N being equal to the total number of wires;
- providing N wire selection means, connected to a source of positive potential, each said wire selection means being connected to the correspondingly ordered wire N in each group M; and
- providing M group selection means, connected to a source of negative potential, each said group selection means being connected a different set of N wires.

4. The method of claims 2 or 3 including providing for each print wire an isolating diode to differentiate each print wire from the correspondingly ordered print wires in other groups M.

5. A control circuit responsive to symbol generating means for a multi-wire printhead in contact with metal coated paper comprising:
- means for maintaining the paper at ground potential;
- a source of positive potential;
- first selectively operable means connecting said source of positive potential to each wire in said printhead;
- a source of negative potential;
- second selectively operable means connecting said source of negative potential to each wire in said printhead;
- means for generating a first current from the paper through a print wire into the negative potential said current being sufficient to vaporize the metal coating on the paper; and
- means for generating a second current from said positive potential to said negative potential, said current bypassing the print wire paper junction.

6. The circuit of claim 5 wherein the print wires are arranged in M groups of N wires each.

7. The circuit of claim 6 wherein said first selectively operable means includes N transistors activated by circuit means responsive to said symbol generator means.

8. The circuit of claim 7 wherein each transistor 1–N is connected to all correspondingly positioned print wires in groups 1–M.

9. The circuit of claims 6, 7, or 8 wherein said second selectively operable means includes M transistors activated by circuit means responsive to said symbol generating means.

10. The circuit of claim 9 wherein said M transistors are each connected in parallel to a different set 1–M of N print wires.

* * * * *